United States Patent Office 3,779,964
Patented Dec. 18, 1973

3,779,964
ASPHALT RUBBERIZING COMPOSITIONS
Duane W. Gagle, Homer L. Draper, and Richard J. Bennett, Bartlesville, Okla., assignors to Phillips Petroleum Company
No Drawing. Filed Oct. 8, 1971, Ser. No. 187,869
Int. Cl. C08c *11/68*
U.S. Cl. 260—28.5 AS         6 Claims

ABSTRACT OF THE DISCLOSURE

The low temperature ductility of asphalts is improved by incorporation of a small amount of a blend comprising rubber, a heavy residual petroleum oil high in aromatics, and carbon black. Asphalts containing a liquid oil-rubber-carbon black blend can be used in paving compositions and the like.

---

This invention relates to rubber compositions and asphalts containing same. In accordance with another aspect, this invention relates to homogeneous masterbatch compositions for use in the incorporation of rubber into asphalts comprising a liquid residual oil-rubber-carbon black blend. In accordance with a further aspect, this invention relates to asphalt compositions containing a small but finite amount of a liquid oil-rubber-carbon black blend. In accordance with a further aspect, the low temperature ductility of asphalts is improved by incorporating therein a small amount of a highly aromatic liquid residual petroleum oil-rubber-carbon black mixture.

In recent years numerous advantages have been found for incorporating rubber, particularly synthetic rubber, into asphalts. Rubber gives the asphalt elasticity, increases its ductility, and reduces its susceptibility to temperature changes. The extent to which these advantages can be realized, however, depends upon the extent to which the rubber is dissolved or dispersed in the asphalt. One known procedure for incorporating rubber into asphalt was the addition of a latex emulsion, but this was impractical because of the necessity to flash the water from the asphalt mixture thus formed and, in addition, the asphalt viscosity is often adversely affected by aqueous emulsions. Such a method has many disadvantages inherently present whenever water is allowed to come into contact with hot asphalt.

In accordance with the invention, a homogeneous masterbatch composition is provided for the incorporation of rubber into asphalts without the disadvantages of the prior art such as water being present and the like wherein in the instant invention a small amount of a masterbatch comprising a liquid residual oil, high in aromatics, rubber and carbon black are incorporated into asphalt.

Accordingly, an object of this invention is to provide a homogeneous masterbatch composition for use in the incorporation of rubber into asphalts.

A further object of this invention is to provide improved rubberized asphalt compositions.

A further object of this invention is to provide a process for preparing rubber asphalt compositions.

A still further object of this invention is to provide asphaltic compositions having improved low temperature ductility.

In accordance with the invention, an oil solution of rubber, carbon black and a liquid residual oil high in aromatic content is provided for incorporation into asphalts. The oil solution of rubber, carbon black, and aromatic oil can be added directly to asphalt products which can be accomplished, for example, as these products are being loaded into transport vehicles.

Further in accordance with the invention, the low temperature ductility of asphalts is improved by incorporating therein a finite amount up to about 2 weight percent of a homogeneous masterbatch composition comprising rubber, a liquid residual petroleum oil high in aromatic content, and carbon black.

In accordance with a preferred embodiment of the invention, the masterbatch composition of the invention comprises about 30 to about 40 weight percent rubber, about 60–50 weight percent of the liquid residual petroleum oil, with the balance being carbon black, preferably a furnace black.

It has been found that the oil solution, homogeneous masterbatch composition of the invention is superior to the usual latex emulsion addition in that it is unnecessary to remove water utilizing special equipment and the asphalt viscosity when blended with the masterbatch is not adversely increased as usually occurs with latex incorporation in stored asphalt. The oil functions to solubilize and adjust viscosity of both the solubilized rubber and the asphalt product. In this way the rubberized asphalt will behave in much the same way in mixing, applying and compacting operations as non-rubberized asphalt.

As indicated above, the oil masterbatch of the invention comprises about 30 to about 40 weight percent of a rubber, preferably a synthetic rubber, and about 60 to about 50 weight percent of a liquid residual petroleum oil high in aromatic content, with the balance being carbon black.

The rubber which is used in the compositions of the invention can be either natural rubber or synthetic rubbery homopolymers and copolymers. The synthetic rubbers employed are preferably polymers of open chain conjugated dienes having from 4 to 8 carbon atoms per molecule, for example, 1,3-butadiene, 2,3-dimethyl-1,3-butadiene, and the like. Examples of such polymers are polybutadiene, polyisoprene, polychloroprene, butadiene-styrene copolymers, and the like. Copolymers of mixtures of such conjugated dienes can also be used, as well as copolymers of monomer systems having a major amount of conjugated diene with a minor amount of copolymerizable monomer containing a $C_2=C<$ group. The rubbery polymers that can be employed can be either random or block copolymers.

Examples of such synthetic elastomers are butadiene-styrene copolymers, butadiene-acrylonitrile copolymer, and various vulcanizable solid or semi-solid isoolefin-conjugated diene copolymers. Other copolymerizable monomers which can be used with the class of conjugated dienes described include alpha-methylstyrene, 4-chlorostyrene, 5-methylstyrene, 4 - methoxystyrene, 2 - vinylpyridine, 2-methyl-5-vinylpyridine, 5-methyl-2-vinylpyridine, 5-ethyl-2-vinylpyridine, 4-methyl-2-vinylpyridine, 2-isopropenylpyridine, 5-propyl-2-isopropenylpyridine, 2-octyl-5-vinylpyridine, methacrylonitrile, methyl acrylate, methyl methacrylate, ethyl acrylate, ethyl methacrylate, ethyl vinyl ketone, methyl isopropenyl ketone, methyl vinylether, and the like.

The liquid petroleum oil blended with rubber to produce the homogeneous masterbatch according to the invention is a heavy residual petroleum oil high in aromatic content having an API gravity below 10. The aromatic content of the petroleum oil is ordinarily at least 90 percent. Other materials in the liquid petroleum oil include naphthenic or such resinous components as may be present depending on the degree of cracking. In most cases 99–100% aromaticity characterizes the preferred oil. One suitable aromatic residual oil that has been employed successfully was obtained as a heavy recycle oil produced from the catalytic cracking of atmospheric and vacuum distilled gas oil feedstocks from crude oil refining. This material, which we call Syn Tower Bottoms is an aromatic residual oil having an API gravity of about 5, a pour point of about 100, and a flash point of about 215° F., and essentially 100% aromaticity.

The carbon black that can be employed in the masterbatch of the invention can be any of the known carbon blacks including lamp black, acetylene black, channel black, and furnace blacks. One desirable type of carbon black that is suitable is produced according to Krecji, U.S. 2,564,700. The carbon black for incorporation into the rubber and liquid residual petroleum oil is finely divided, e.g., 50 mesh or finer.

As indicated above, the amount of rubber employed in producing the masterbatch of the invention will be sufficient to result in a mixture wherein the rubber amounts to approximately 30–40 weight percent by weight based upon the total weight of masterbatch. Similarly, the liquid petroleum residual oil is used in an amount sufficient to result in a mixture wherein the oil amounts to approximately 60–50 weight percent of the total masterbatch mixture. The balance of the masterbatch, which will amount to about 10 weight percent, will be the carbon black.

One method of producing the masterbatch compositions in accordance with the invention involves mixing a desired amount of the rubber, heavy residual petroleum oil and carbon black under conditions sufficient to produce a homogeneous blend of the liquid oil, rubber and carbon black. In accordance with another method for producing the masterbatch of the invention, the aromatic oil, into which carbon black has been inducted, and oil phase rubber are independently but simultaneously proportioned into a colloid mill for intimate dispersal and homogenizing. The masterbatch product can then be stored for future shipment. The optimum temperature of mixing will relate to the viscosity of the aromatic oil employed, preferably between 175–200° F.

The asphalts that can be improved according to the invention include any of those bituminous materials used heretofore and known in the prior art such as natural asphalts or those derived from petroleum refining, for example, by vacuum distillation, solvent refining, steam refining with or without air blowing, and the like. Asphalts characterized by penetrations (ASTM D–551) from 15 to 300 dmm., decimillimeters, and preferably from 80 to 200 dmm. (77° F., 100 grams, 5 seconds), and having softening points (ASTM D–3626) in the range of 90 to 200° F., and preferably 105 to 120° F., represent suitable asphalts that can be employed.

In accordance with the invention, asphalts such as defined above can be improved by incorporating a finite amount up to about 2 weight percent of the above-defined masterbatch to yield asphalts having improved ductility.

Paving compositions can be prepared by combining suitable mineral aggregate with an asphalt containing the defined amount of the rubber masterbatch defined above.

The rubber masterbatch of the invention can be incorporated into the asphalt in any desired manner. The masterbatch can be added directly to molten asphalt products without any special procedure. In accordance with another method for producing the asphalt compositions of the invention, the rubber-carbon black masterbatch can be proportioned into an asphalt stream going to a transport, either truck or tank car. Any conventional blend proportioning equipment such as mixing tees; metering valves or ratio flow controllers as used in the industry is suitable for this purpose. For example, the masterbatch can be used alternately with the same pump and proportioning equipment as used for addition of anti-strip compounds in asphalt blending installations.

In accordance with one method for producing paving compositions of the invention, the desired proportions of the asphalt containing the rubber-carbon black masterbatch is added to a pugmill of an asphalt mix plant in the normal manner, usually from 4% to 7% by weight of the mineral aggregate weight. This would apply to batch mixing and continuous mixing plants.

For travel plant, road mix and seal coat operations, the rubber-carbon black treating asphalt can be used in the same manner and essentially the same proportions as untreated asphalt.

SPECIFIC EXAMPLE

A masterbatch of liquid residual petroleum oil, rubber and carbon black was prepared by mixing together these materials in amounts sufficient to form a masterbatch comprising 32 percent rubber, 59 percent liquid petroleum oil, and 9 percent carbon black.

The rubber was a solution polymerized block copolymer of butadiene-styrene having a ratio of butadiene to styrene of 75/25.

The liquid residual petroleum oil was a Syn Tower Bottoms, which is an aromatic residual oil having an API gravity of 5.1 and an SFV of 55 at 122° F., plus 100 pour point, a flash point of 215° F., and essentially 100 percent aromaticity.

The carbon black was a soft furnace black having an $N_2$ surface area of 45 sq. m./g. (ASTM grade according to ASTM D 2516–66T) identified as Phil-black N–550.

The above masterbatch was added to 85–100 penetration and 60–70 penetration asphalts with the following increase in ductility at 39.2° F.

|  | Weight percent of masterbatch compound | | | | | |
|---|---|---|---|---|---|---|
|  | 0 | .25 | .50 | .75 | 1.0 | 1.25 |
| 85–100 Pen. A.C.: | | | | | | |
| Penetration, 77° F | 91 | 92 | 97 | 97 | 99 | 99 |
| Ductility at 39.2° F | 20 | 20.2 | 21.1 | 27.8 | 33.2 | 38.4 |
| 60–70 Pen. A.C.: | | | | | | |
| Penetration, 77° F | 66 | 63 | 69 | 72 | 74 | 76 |
| Ductility at 39.2° F | 12 | 12.3 | 14.7 | 18.3 | 24.2 | 27.9 |

It will be seen from the above table that the ductility for both asphalts was significantly increased with small amounts of the masterbatch wherein the amounts range from 0.25 to 1.25 weight percent.

We claim:

1. An asphalt composition of improved low temperature ductility comprising (1) asphalt having a pentration (ASTM D–551) from 15 to 300 dmm., decimillimeters, and a softening point (ASTM D–3626) from 90 to 200° F. and (2) 0.25 to 2 weight percent of a liquid oil-rubber-carbon black blend incorporated therein, said blending consisting essentially of (a) about 30–40 weight percent of a rubber solubilized by the oil defined in (b), said rubber being selected from natural rubber, rubbery homopolymers and copolymers of open chain conjugated dienes having from 4–8 carbon atoms per molecule, and rubbery copolymers of said dienes with a minor amount of a copolymerizable monomer containing a $C_2=C<$ group, and (b) about 60–50 weight percent of a liquid petroleum oil having an aromatic content of at least 90 weight percent and an API gravity below 10, with the balance being (c) carbon black.

2. A composition according to claim 1 wherein said asphalt has a penetration (ASTM D–551) from 80 to 200 dmm., decimillimeters, and a softening point in the range 105 to 120° F.

3. A composition according to claim 1 wherein said rubber is a butadiene-styrene copolymer having a major amount of butadiene and the amount of carbon black present is about 10 weight percent.

4. A composition according to claim 1 wherein said liquid petroleum oil has an API of less than 8 and is characterized as having 99–100 weight percent aromatics.

5. A composition according to claim 2 wherein (a) is a butadiene-styrene block copolymer having a ratio of butadiene to styrene of 75/25 and wherein the amount of said blend incorporated into said asphalt ranges from 0.25 to 1.25 weight percent.

6. A rubberized asphalt composition having improved low temperature ductility according to claim 1 wherein said asphalt has a penetration (ASTM D-551) from 80 to 200 dmm., decimillimeters, and a softening point in the range 105 to 120° F. and wherein (a) is a butadiene-styrene block copolymer having a ratio of butadiene to styrene of 75/25, (b) is a residual oil having an API of about 5, a pour point of about 100, and a flash point of about 215° F., and (c) is a furnace black and is present in an amount of about 10 weight percent.

References Cited
UNITED STATES PATENTS 3,112,288  11/1963  Davis et al. ____ 260—41.5 MP
3,379,662  4/1968  Bramble et al. ___ 260—28.5 AS

OTHER REFERENCES

Morton: Introduction to Rubber Technology (Reinhold) (N.Y.) (1959), p. 170.

MORRIS LIEBMAN, Primary Examiner

H. H. FLETCHER, Assistant Examiner

U.S. Cl. X.R.

260—33.6 AQ, 41.5 MP, 41.5 R, 759, 761, 762